INVENTOR

KLAUS D. J. HAEFNER

By Krafft & Wells
ATTORNEYS

INVENTOR
KLAUS D. J. HAEFNER

By *Krafft & Wells*
ATTORNEYS

INVENTOR
KLAUS D. J. HAEFNER
By Krafft & Wells
ATTORNEYS

United States Patent Office 3,514,180
Patented May 26, 1970

3,514,180
DEVICE FOR SIMULTANEOUSLY VIEWING THE OBJECT AND COORDINATES OF THE OBJECT PLANE IN MICROSCOPES AND THE LIKE
Klaus D. J. Haefner, Richardson, Tex., assignor to Ernst Leitz GmbH, Wetzlar, Germany
Filed Mar. 7, 1968, Ser. No. 711,288
Claims priority, application Germany, Mar. 11, 1967, H 62,095
Int. Cl. G02b 21/40, 27/32, 27/02
U.S. Cl. 350—90                                      5 Claims

ABSTRACT OF THE DISCLOSURE

In an intermediate image plane of a microscope there are provided a rotatable scale and a stationary index which can be seen in the field of view together with the object to be observed. The scale is provided with a toothed rim by means of which it is connected via a suitable gear train to the set screw of the mechanical stage of the microscope, so as to be rotated through a proportional angle whenever the stage is displaced.

CROSS-REFERENCE TO RELATED APPLICATION

Applicant claims priority under 35 USC 119 for application No. H62,095 IXb/42c, filed March 11, 1967 in the Patent Office of the Federal Republic of Germany.

BACKGROUND OF THE INVENTION

Field of the invention

The present invention relates to optical viewing instruments with which an object on a displaceable object carrier or stage can be observed. More particularly the invention pertains to microscopes.

Description of the prior art

In order to establish the coordinates of the object viewed it has been common practice in this particular art to provide the displaceable stages of microscopes with a scale that is movable together with the stage. The position of the scale, i.e. the position of the scale itself, is defined against a stationary vernier scale. Of course it is also known to attach the vernier scale to the stage and to make the scale itself stationary. Such prior art device is for example, disclosed in U.S. Pat. 2,474,163. This device as well as all other known modifications require the observer to read the coordinates of the object or stage apart from the object observation. Object and scale cannot be viewed simultaneously.

This is a serious disadvantage, since with many types of observations it means a facilitation of the observation task if object and scale appear together in the viewing field. Such observations being, for example, microscopic distance measurements, and further, those observations during which the object is to be displaced a predetermined distance, or when particular object spots have to be relocated quickly.

SUMMARY OF THE INVENTION

It is therefore an object of the present invention to provide a device which is adapted to overcome the above mentioned difficulties. It is another object of the invention to provide a scale in the viewing field which will appear as an enlarged image to the viewer.

These objects are attained by arranging a flat ring-shaped scale in an intermediate image plane of the microscope and by making said scale rotatable in exact proportion to the stage displacement in one direction. If a binocular eyepiece is used one of said scales may be arranged in the intermediate image plane of each ocular and each scale may be assigned to one of the two perpendicular directions, so that, as a result, stage displacement in these two directions may be read from the two scales together with the observed object.

According to the invention said ring-shaped scale is provided with a toothed rim and is by means of said rim in driving engagement with the set screws of the mechanical stage. To this end, any suitable kind of connection rod or connecting shaft may be introduced between the set screw and a spur gear which is in mesh with said toothed rim. Flexible shafts have proven particularly convenient if the axes of the spur gear and of the set screw extend in parallel.

The ring scale is provided with equidistant marks that can be read against a stationary index or vernier scale. The ring scale is preferably transparent and plane-parallel. However, it is also possible to use a lens ring as the scale carrier so that of the scale an enlarged image will be viewed by the observer.

This basic design is susceptible to various modifications which, however, are all well within the orbit of design skill. For example, it is not at all necessary to arrange the ring-shaped scale so that it will rotate concentrically around the optical axis. Rather can the center of the scale be located outside of the microscope tube. The scale will then rotate only through one side of the viewing field.

DESCRIPTION OF THE DRAWINGS

Further modifications are illustrated in the appending drawings wherein.

Figure 1:
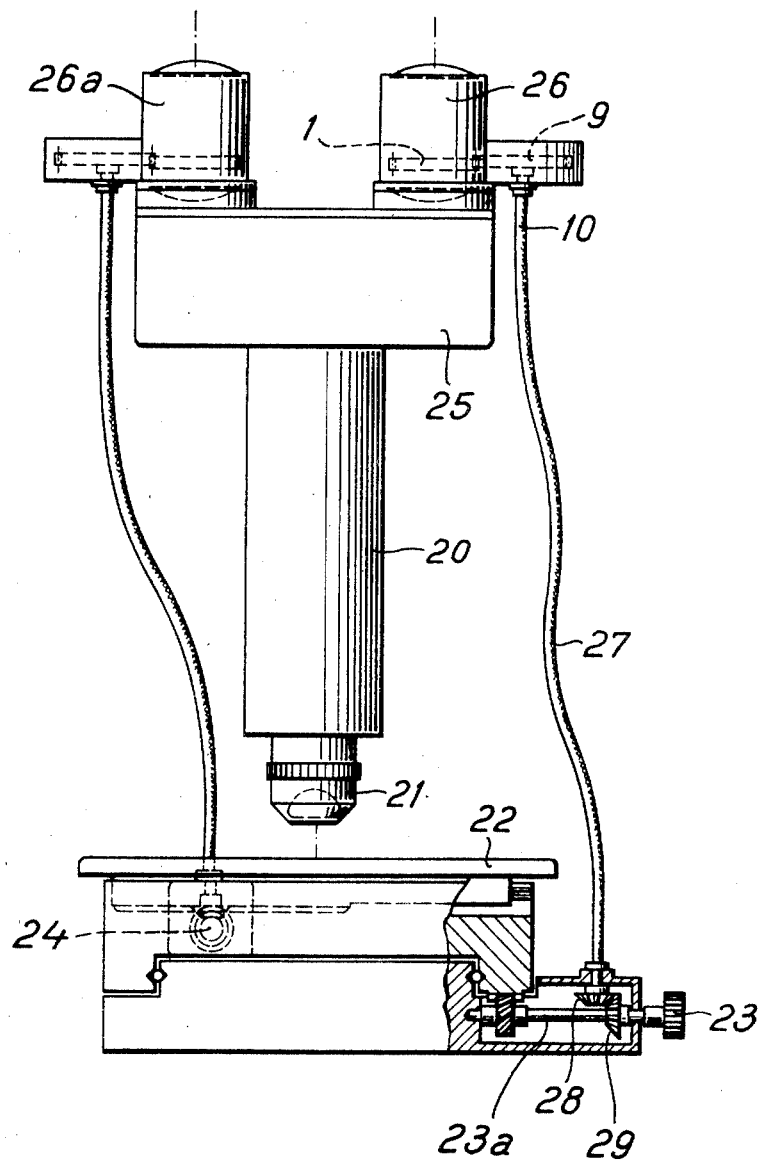
FIG. 1 is the front view of a microscope equipped with a binocular tube containing a viewing device according to the invention in each eyepiece.

Referring now to the drawings there is illustrated in FIG. 1 a microscope comprising a tube 20 to which the objective 21 is attached. Below the latter is arranged the mechanical stage 22; rack and pinion drive means are provided which are adapted to displace the stage in two directions perpendicular to each other. Said drive means being operable by means of two set screws 23, 24, one for each direction of movement.

On top of the microscope tube 20 there is fastened a binocular tube 25 having two eyepieces 26, 26a. Each eyepiece is provided with a viewing device according to the invention, said device comprising, for example, a ring-shaped scale (FIGS. 2 and 3) disposed in an intermediate image plane of the microscope between the ocular lenses 6 and 7. Scale 1 being rotatable about the optical axis and being supported by ring 1d which is solidly connected to the eyepiece mount.

Scale 1 is provided with equidistant marks 2 and is further provided with a toothed rim 4. With rim 4 in mesh is a spur gear 9 which has a shaft 10 journaled in a bearing 5.

To shaft 10 is rigidly connected a flexible shaft 27 (FIG. 1) the other end of which is in connection with a bevel gear 28, the latter being in driving engagement with a second bevel gear 29. Gear 29 is a solid portion of screw shaft 23a and will be rotated whenever the set screw is operated. Every displacement of the mechanical stage in one direction will thus result in a proportional rotation of scale 1, the propelling force being transmitted from set screw 23 to scale 1 via the flexible shaft 27 and spur gear 9. It is, however, emphasized that shaft 27 is only cited as one example of many driving connections that can be applied with equally satisfactory results.

In the plane of scale 1 there is also disposed a stationary vernier scale 3 against which the scale 1 can be read. The observer is thus in a position to view the object and simultaneously to read the amount of any stage displacement which he chooses to perform by turning the set screw 23 without lifting his eye from the eyepiece.

In an embodiment as illustrated in FIG. 1 it is, of course, possible to observe the stage displacement in two directions, since by turning set screw 24 the scale in the other eyepiece is rotated in an analogous manner. With each eye the observer can watch the degree of stage displacement in one direction.

Figure 2:
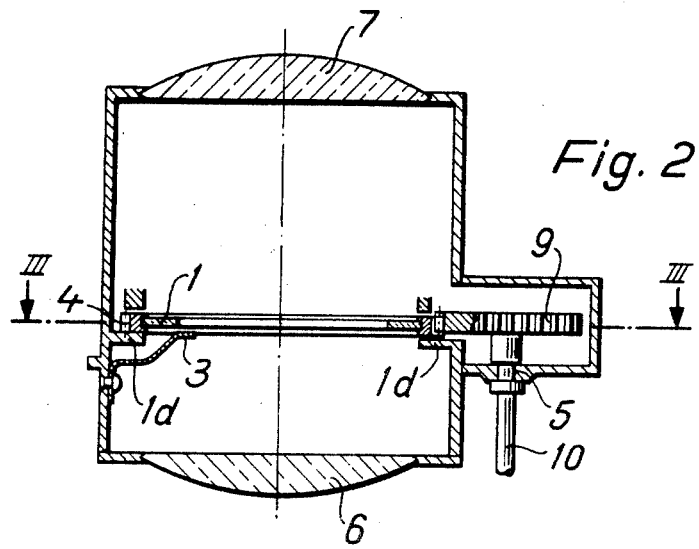
FIG. 2 is a sectional view of an ocular which is provided with a ring-shaped scale in an intermediate image plane between the ocular lenses.
Figure 3:
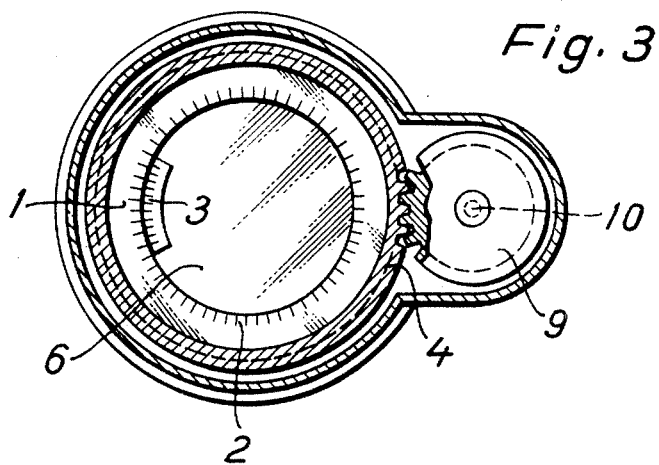
FIG. 3 is a cross-sectional view cut along line III—III of FIG. 2.
Figure 4:
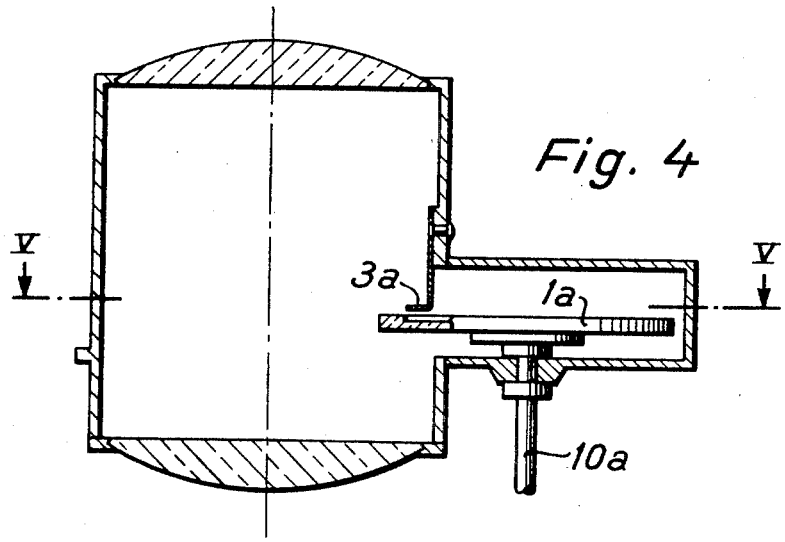
FIG. 4 shows a second embodiment of the invention in an ocular.
Figure 5:
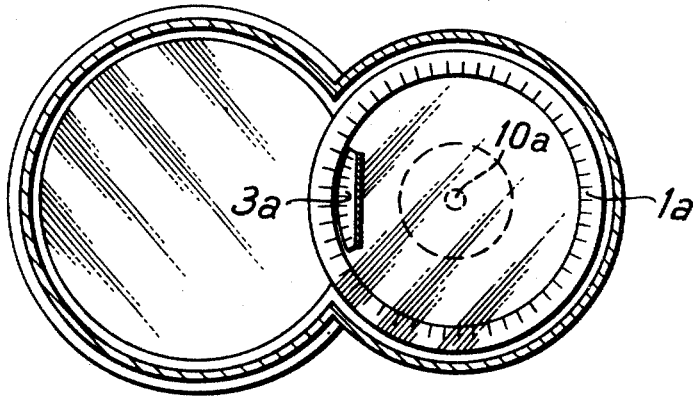
FIG. 5 is a cross-sectional view cut along line V—V of FIG. 4.

A first modification of the above described basic idea is illustrated in FIGS. 4 and 5. The scale that is ring-shaped in the FIGS. 1–3 is here shown to be a disc 1a with the scale marks being arranged along the outer circumference. A toothed rim is not provided, rather is the disc itself positively connected to the end of shaft 10a. The disc 1a extends only with a small section into the field of view, where a stationary index mark or, as shown, a vernier scale 3a is arranged adjacent the marks on the visible disc section.

Figure 6:
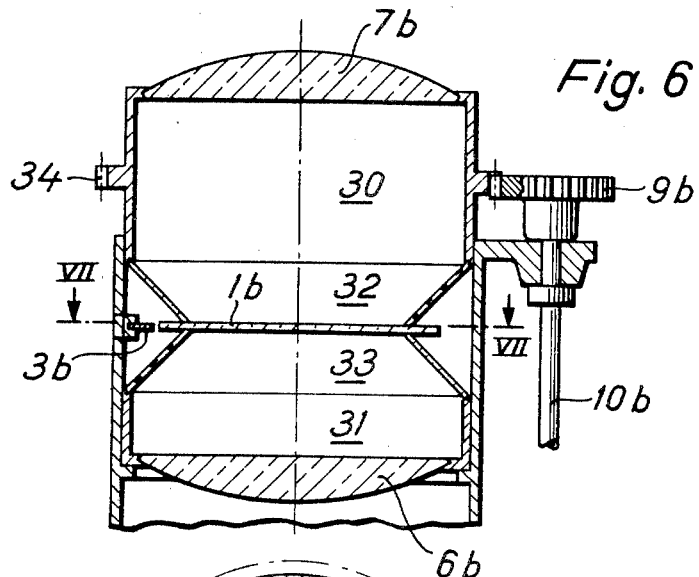
FIG. 6 shows schematically an inclined ring-shaped scale that is connected to the rotatable ocular.
Figure 7:
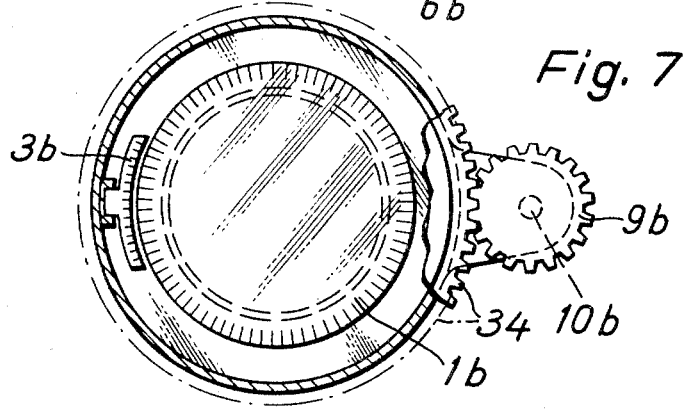
FIG. 7 is a cross-sectional view cut along line VII—VII of FIG. 6.

Another modification is shown in FIGS. 6 and 7. The scale 1b in this embodiment is connected to the eyepiece mount carrying the ocular lenses 6b and 7b. The mount is subdivided into an upper and a lower metal case 30 and 31 between which two conical rings 32, 33 are inserted in rigid connection with the metal cases.

The conical rings 32, 33 are manufactured from a transparent material, e.g. glass or a transparent synthetic material such as methacrylate, and between said rings 32, 33 scale 1b is mounted. Case 30 is provided with a spur gear 34 which is in driving engagement with spur gear 9b on the end of shaft 10b.

Upon rotation of shaft 10b and gear 9b gear 34 will be caused also to rotate and with the latter rotates as a unit the eyepiece complete with lenses 6b, 7b and scale 1b. A vernier scale 3b is stationarily fixed to the inner wall of the eyepiece tube and the degree of rotation, i.e. the amount of stage displacement, can be determined from the marks on scale 1b against the vernier scale 3b.

Figure 8:
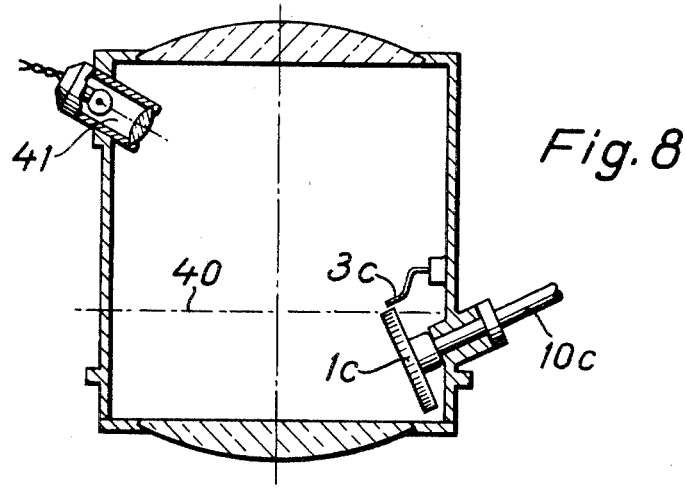
FIG. 8 is a schematic sectional view of an ocular provided with another modification of the inventory viewing device.

In FIG. 8 is illustrated a further embodiment which makes use of a cylinder scale 1c. The cylinder is also disc-shaped, however the scale marks are provided on the disc's cylindrical surface. The cylinder scale 1c is mounted on the end of shaft 10c which is, like in previously described embodiments, in suitable driving engagement with the set screw for stage displacement.

The intermediate image plane wherein the marks of the cylinder scale 1c are to appear when read by a viewer is defined by line 40 and it will readily be recognized that in this embodiment only a limited number of scale marks can be viewed at a time, with all remaining marks staying out of focus.

A reference mark 3c is again stationarily supported by the inner wall of the eyepiece tube and additionally there is provided a spot-light device 41 for illumination of the scale marks and the reference mark 3c.

Having thus described the invention in detail it will readily be comprehended that the invention is susceptible to various kinds of modifications with regard to scale arrangement and linkage of the scale to the stage set screws. Further will it be apparent that the invention, although described here in connection with microscopes, will be equally applicable to related optical observing instruments comprising an eyepiece and an object carrier or stage.

What I claim is:

1. An optical viewing instrument comprising:
 an eyepiece;
 an objective in optical alignment with said eyepiece;
 a displaceable object carrier remote from said eyepiece and in optical alignment with said eyepiece;
 means for displacing said object carrier;
 a rotatable scale means disposed in an intermediate image plane between said eyepiece and said objective and in optical alignment with said eyepiece and said object carrier whereby the rotatable scale is viewed in focus simultaneously with the object being observed, said scale means having equidistant marks thereon;
 means for rotating said rotatable scale;
 a stationary reference mark disposed adjacent said equidistant scale marks in said intermediate image plane and in optical alignment with said eyepiece and said object carrier; and
 a single actuating means interconnecting both said means for rotating and said means for displacing and rotating said scale means upon displacement of said carrier through a proportional angle, whereby said carrier and scale are rotated simultaneously.

2. An optical viewing instrument according to claim 1, wherein said scale means is a ring, said ring being rotatable concentrically to the optical axis between the eyepiece lenses.

3. An optical viewing instrument according to claim 1, wherein said scale means is a disc (1a), said disc being rotatable about an axis parallel to the optical axis.

4. An optical viewing instrument according to claim 1, wherein said scale means is a disc (1c), said disc being rotatable about an axis which is inclined to the optical axis so as to position the uppermost portion of the cylindrical disc surface in an intermediate image plane, said disc being provided with scale marks on its cylindrical surface.

5. An optical viewing instrument according to claim 4 and further comprising a spot light device (41), said device being adapted to illuminate said uppermost surface portion.

References Cited

UNITED STATES PATENTS

| 854,310 | 5/1907 | Robertson | 350—10 |
|---|---|---|---|
| 2,817,994 | 12/1957 | Ehrenhaft et al. | 350—10 X |
| 1,974,606 | 9/1934 | Fassin | 350—86 X |
| 2,412,017 | 12/1946 | Taylor et al. | 350—100 XR |
| 2,775,158 | 12/1956 | Mitchell | 350—80 X |

FOREIGN PATENTS

| 969,853 | 5/1950 | France. |
|---|---|---|
| 975,598 | 10/1950 | France. |
| 153,231 | 3/1932 | Switzerland. |

PAUL R. GILLIAM, Primary Examiner

U.S. Cl. X.R.

350—10, 81, 110, 239